United States Patent
Averbuch

(10) Patent No.: US 9,277,157 B2
(45) Date of Patent: Mar. 1, 2016

(54) INTERACTIVE MARKETING SYSTEM

(71) Applicant: Gravidi, Inc., Wellington, FL (US)

(72) Inventor: Andrei Paul Averbuch, Cedar Grove, NJ (US)

(73) Assignee: Gravidi, Inc., Wellington, FL (US)

( * ) Notice: Subject to any disclaimer, the term of this patent is extended or adjusted under 35 U.S.C. 154(b) by 214 days.

(21) Appl. No.: 13/837,915

(22) Filed: Mar. 15, 2013

(65) Prior Publication Data

US 2013/0212477 A1    Aug. 15, 2013

Related U.S. Application Data

(63) Continuation-in-part of application No. 10/931,389, filed on Sep. 1, 2004, now Pat. No. 8,601,516.

(51) Int. Cl.

| | |
|---|---|
| *H04N 5/44* | (2011.01) |
| *H04N 5/765* | (2006.01) |
| *H04N 7/173* | (2011.01) |
| *H04N 21/422* | (2011.01) |
| *H04N 21/426* | (2011.01) |
| *H04N 21/475* | (2011.01) |
| *H04N 21/478* | (2011.01) |
| *H04N 21/61* | (2011.01) |
| *H04N 21/84* | (2011.01) |
| *H04N 21/8543* | (2011.01) |
| *H04N 21/4725* | (2011.01) |
| *H04N 21/81* | (2011.01) |
| *H04N 21/858* | (2011.01) |
| *G06Q 30/02* | (2012.01) |
| *H04N 5/775* | (2006.01) |
| *H04N 21/462* | (2011.01) |

(52) U.S. Cl.
CPC ............ *H04N 5/4403* (2013.01); *G06Q 30/02* (2013.01); *H04N 5/765* (2013.01); *H04N 7/17318* (2013.01); *H04N 21/42204* (2013.01); *H04N 21/42646* (2013.01); *H04N 21/475* (2013.01); *H04N 21/4725* (2013.01); *H04N 21/47815* (2013.01); *H04N 21/6175* (2013.01); *H04N 21/812* (2013.01); *H04N 21/84* (2013.01); *H04N 21/8543* (2013.01); *H04N 21/8583* (2013.01); *H04N 5/775* (2013.01); *H04N 21/4622* (2013.01)

(58) Field of Classification Search
CPC .................................................... H04N 5/4403
See application file for complete search history.

(56) References Cited

U.S. PATENT DOCUMENTS

2002/0120564 A1 *  8/2002  Strietzel .......................... 705/40
2007/0260677 A1    11/2007  DeMarco et al.

(Continued)

OTHER PUBLICATIONS

PCT Notification of Transmittal of the International Search Report and the Written Opinion of the International Searching Authority, or the Declaration dated Aug. 11, 2014.

*Primary Examiner* — Peiyong Weng
(74) *Attorney, Agent, or Firm* — Locke Lord LLP; Peter J. Fallon

(57) ABSTRACT

This invention relates generally to a content integration and delivery system and a method of using the same. In particular, the present invention relates to a system that integrates digital video content with object-oriented script (hotspots) to provide object specific marketing, including potential channels of distribution, such as internet shopping. The system includes the process of identifying and marking the relative location of specific objects within digital media and providing an outlay for the users to locate the object over the global system of interconnected computer networks (e.g. Internet). By using the disclosed interactive platform, a user can easily view, display, select and purchase any featured product in the video through Internet.

21 Claims, 8 Drawing Sheets

(56) References Cited

U.S. PATENT DOCUMENTS

| | | |
|---|---|---|
| 2010/0010893 A1 | 1/2010 | Rajaraman et al. |
| 2011/0063415 A1* | 3/2011 | Gefen et al. .................... 348/43 |
| 2011/0112914 A1* | 5/2011 | Geer et al. ................ 705/14.73 |
| 2012/0308206 A1 | 12/2012 | Kulas |

* cited by examiner

```xml
<?xml version="1.0" encoding="utf-8" ?>
<fpid dvd="SpiderMan2" id="124r23r21"
    metadata="metadata_spiderman2.xml">
<brand>
<name>Mattel</name>
<address>
<street>41 Tree St.</street>
<city>Newark</city>
<state>NJ</state>
<zip>05050</zip>
<url>www.matteltoys.com</url>
<email>deiissmattel@matteltoys.com</email>
<phone>313-333-3331</phone>
</address>
<product id="00210">
<price>300.98</price>
<description>Mattel Toys Spidey T-Shirt</description>
<detaileddescription>Get this fashionalble Spidey T-Shirt from Mattel Toys
    depicting their latest and greatest toy: SpiderMan Miniature! Made from
    pure imported wool form Slovakia, with no preservatives or artificial
    flavors!</detaileddescription>
<promo>20% Off</promo>
<options>
<color>red</color>
<color>green</color>
<color>white</color>
<size>S</size>
<size>M</size>
<size>L</size>
<size>LX</size>
<size>LXX</size>
</options>
<seller>matteltoys.com</seller>
<seller>wallmartonline.com</seller>
<seller>kmartonline.com</seller>
</product>
</brand>
</fpid>
```

FIG. 3

INTERACTIVE MARKETING SYSTEM

CROSS-REFERENCE TO A RELATED APPLICATION

This application is a Continuation-In-Part (CIP) of the U.S. patent application Ser. No. 10/931,389 filed Sep. 1, 2004, the content of which is incorporated herein in its entirety.

FIELD OF THE INVENTION

This invention relates generally to a content integration and delivery system and a method of using the same. In particular, the present invention relates to a system that integrates digital video content with object-oriented script to provide object specific marketing, including potential channels of distribution, such as internet shopping. The system includes the process of identifying and marking the relative location of specific objects within digital media and providing an outlay for the users to locate the object over the global system of interconnected computer networks (e.g. the Internet).

BACKGROUND

Recently more and more appliances, TVs, DVD/Blue Ray players, Digital Video Recorders, Streaming Media Players, and other similar devices obtain the capability to connect to the internet either through a modified strip down version of Linux OS, Windows Media OS, or a Java based applet. Having such permanent or semi-permanent access to the internet provides the viewer with an option of on-demand digital entertainment delivery, which became even more popular through such offering as Xfinity On Demand, Netflix, Hulu, Vudu, Google Play, Apple TV and others.

Even though the programing may be on demand, the marketing/advertisement approach and lack of access to additional related content is still the same. That is, for example, evenly distributed throughout the digital media, e.g., in the case of a full-length movie, the service provider sets time points at which the movie stops and an advertisement runs, and there is no ready access to additional content. Typically, all of this additional content is integrated and digitized together. The drawback of the current system of advertisement, marketing, and additional content delivery is that the viewer may get agitated by the interruptions and has little or no connection to the product being promoted or the ability to access the information at any time during the playback.

Therefore there is a continuing need to develop an alternative product distribution and marketing system that would engage the viewer and relate the viewer's entertainment experience to the product being promoted.

SUMMARY

In view of the above-described problems, needs, and goals, the inventors have devised embodiments of the present invention in which an interactive marketing system allows the viewer to pick objects within digital video content for immediate or subsequent consideration. Generally, the system integrates digital video content with object-oriented localization script to provide object specific marketing. The system includes the process of identifying and marking the objects displayed within the digital media and providing an outlet for the viewers to locate the object over the internet or a pre-loaded database.

In one exemplary embodiment, a digital content delivery or on-line shopping system/method involving TV, DVD player, and Internet is provided. While this embodiment is described with reference to a DVD player, those skilled in the art would recognize that any internet-connected device capable of delivering and presenting digital video media can be employed with the disclosed digital content delivery and on-line shopping system/method.

Through the use of a remote control or other interface, the user can sign up with a service provider and receive commercial product(s) information, and other desired or relevant information, which can be stored as a multilayer of overlapping content in DVD or locally in the memory of the device. Such overlapping content is called a metadata layer and can include information about a target object, region or theme other than its mapping data. For example, it may include textual, image, video, audio and other descriptions of the target, as well as links to further related data outside the physical realm of the video such as the internet.

Thereafter the user can retrieve the metadata layer at any time during the DVD, or other format video media, playback. The user either can view the downloaded digital content (movie, video or audio) or review what particular products are available for purchase, or what objects within the media are tagged (or marked-up) using the metadata. When the user is viewing the downloaded digital content, the user will access the data as he is accessing any regular DVD or other format video media. If the user is ready to do on-line shopping or view the objects within the media that are marked-up or tagged, the user has an option to pause the DVD or other format video media playback. This action also freezes the overlaying featured product or objects featured in the media metadata layer. The user can tab through visible highlighted products or objects featured in the digital media. With one button click or analogous behavior (e.g. touch screen, mouse, voice activation, etc.) in the device's user interface, the user can place an order using a pre-stored credit account through the internet merchant gateway and have the product shipped to a pre-stored shipping address, or just find out more information about objects featured in the digital media. The user of an exemplary embodiment of the invention can readily interact with the system by using remote control or analogous behavior in the device's user interface to select and purchase a desired product, or just find out more information about objects featured in the media.

BRIEF DESCRIPTION OF THE DRAWINGS

FIG. 3 is an example of using XML language to implement the Metadata structure for an available product;

DETAILED DESCRIPTION OF THE INVENTION

Figure 1:
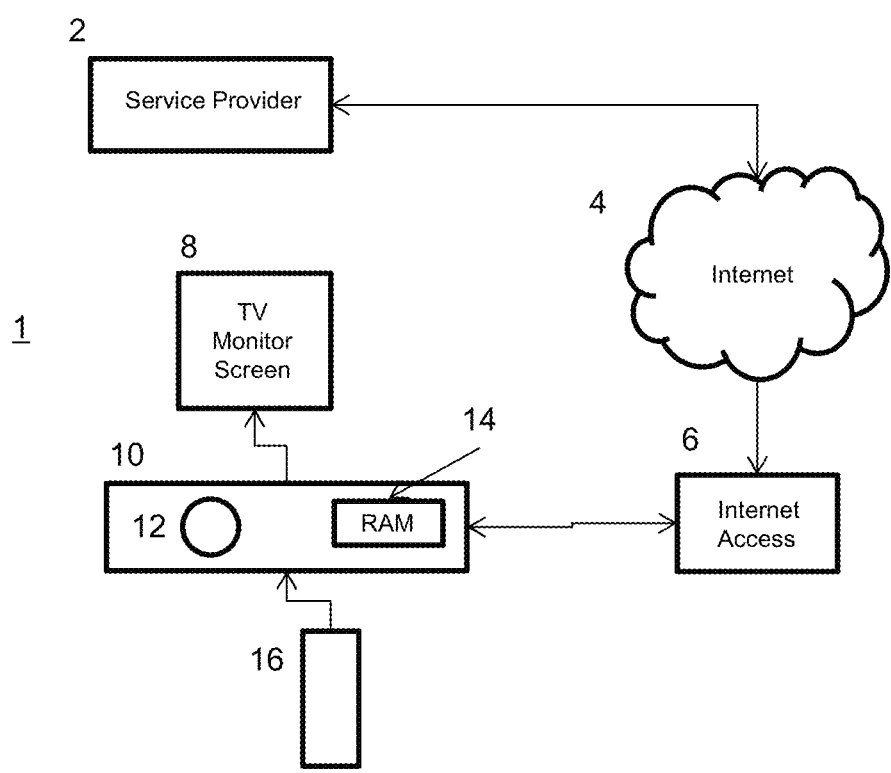
FIG. 1 is an overview of an exemplary main system with major components and their relationships.

The generalized system configuration for integrating digital content with object-oriented script(s) to provide object specific marketing is illustrated in FIG. 1A. At the end user side, the system 1 includes a display device 8, a digital media reproduction device 10 with user interface 16, and an Internet access means 6, such as phone line, cable line, electrical line, optical line or a wireless connection. Throughout this specification, the system and processes for its use will be described using one or more exemplary embodiments that illustrate exemplary advantages provided by their use. However, it is to be understood that the invention is not limited to these embodiments and may include other systems with the same or similar functionalities. The digital media reproduction device 10 can be selected from any visual processing device capable of playing video (i.e., converting data into a visual information), such as, but not limited to, DVD/Blue-ray player, an internet enabled TV, a desktop or laptop computer, a tablet type computing device, and a mobile device (e.g. a smart phone). Typically, such media reproduction device 10 is capable of playing streamed or locally encoded content identified as one or more of MPEG, MPEG-2, MPEG-4, Flash, AVC, AVHCD, DIVX, DV-AVI, H.264, Matroska MKV, Quicktime, Tivo Video, and others. (see www.fileinfo.com/filetypes/video for additional formats). The media reproduction device 10 can be connected to the display device 8 via cables, wires, or a wireless connection. The display device 8 can be a screen device that is connected to or embedded in the media reproduction device 10 and is capable of displaying video media, such as a TV, a computer, a tablet mobile device, etc. In one exemplary embodiment, the media reproduction device 10 and the display device 8 are interconnected and confined within the same device, e.g. a tablet.

The user interface 16 can transmit the user's input by wireless/wired means to the media reproduction device 10. The user interface 16 can be any interface device such as a remote control (infra-red, radio frequency or Bluetooth), a mouse, a touchpad (e.g. touch screen tablets) or a combination thereof. For example, if the media reproduction device 10 is a DVD player and the display device 8 is a TV, the user interface 16 can be a remote control transmitting commands to the media reproduction device 10 through an infrared signal.

Generally, the user interface 16 is used to interact with the object-oriented script profiles (or video embedded entities) within the encoded video content in the media reproduction device 10 using an interface script that calls up an object related information from the service provider 2 over the internes 4. The video embedded entities are objects, and other concepts such as products, locations, semantic and abstract contexts related to objects or other distinct content within the encoded video, defined by semantic category as well as physical location in 2D or 3D space of an entity within the encoded video frame(s). For example, a car in a scene from the movie Bullit; the sunglasses worn by Tom Cruise's character in the film Risky Business; the location of Times Square in NYC in the dream sequence of the film Magnolia; and many more.

The interface script is a software program (referred to as authoring software thereafter) written to allow the media reproduction device 10 to display and interact with objects and concrete concepts embedded/displayed within the encoded video through the user interface 16 by rendering an entity display layer and the encoded video simultaneously. This interaction may consist of, but is not limited to, tagging of the video embedded entities, purchasing the video embedded entities showcased in the encoded video directly from the media reproduction device 10, as well as downloading and displaying additional contextual information related to the video embedded entities. In an exemplary embodiment, tagging of the video embedded entities is done in authoring software.

The authoring software allows the user to view the video as well as to play, pause and scrub frames. Scrubbing is moving forward or back through a video timeline at user's own pace using a frame scroll interface. It is analogous to jog-shuttling. The authoring software allows the user to view a frame-by-frame scroll view representation of the video for easy back and forth scrubbing, and gives the user an interface input capability by using a touch or a mouse or another human to computer interface to create a 2D or 3D mapping or a visual representation of a desired area or object in a video frame. Scroll view is a linear display of sequential frames in the video which can be scrolled left or right to reveal more frames from an earlier or later time range of the video. Preferably, the user has the ability to "tag" video content through the selection of objects viewed in the authoring software. This selection may take place on a touch enabled device in which the user can tap or touch the object to select it. The selection may take place using a computer and a mouse to select the object. In other embodiments selection of objects may take place through physical gestures, voice or other means.

The authoring software also allows the user to continue mapping the object or area (motion tracking) by using software image recognition or by manually navigating frame by frame and adding new coordinates to a sequential list of 2D or 3D coordinates until the object or area is no longer in view. After an object is tagged the object can be tracked through the video frames in which the object remains visible. In one embodiment the user can manually continue mapping the object by navigating frame by frame and adding coordinates to a sequential list. In another embodiment software can algorithmically identify and track objects and provide coordinates to the authoring software. The authoring software also allows the user to relate the tag coordinates list to a unique ID representing a set of metadata describing the object or area tagged by the coordinates. Using the authoring software, the user can also edit any existing coordinate set in any frame after it has already been created, either by modifying the coordinates or the unique ID or by deleting the coordinate set for that frame completely. In one embodiment, the user is provided with the capability to store a static image or copy of any video frame in relation to the object or area being tagged using the authoring software. The user can as well store the frame range of a tagging sequence related to an object or area on the screen. Using the authoring software, the user can use the frame range of a tagging sequence to generate independent clips of video from the original frames in that range. Preferably, the user can generate and store a file representing the tagging coordinate and visual mapping data (i.e., a visual representation of an area inside a video frame, which is a symbolic depiction highlighting relationships between elements within that area, such as objects, regions, and themes), which can then be used to generate visual, audio and/or any other representation of the tag data.

In another embodiment, the authoring/playback software consists of, but is not limited to, three components: (1) content management system (CMS); (2) composer tool, and (3) playback tool. Depending on the system, user, provider and other factors, each component can be part of one interactive system having the capabilities of all three components or each component can be independently implemented. The authoring software can be implemented as part of an apparatus that has at least one processor, and at least one memory including the authoring software therein.

Figure 5:
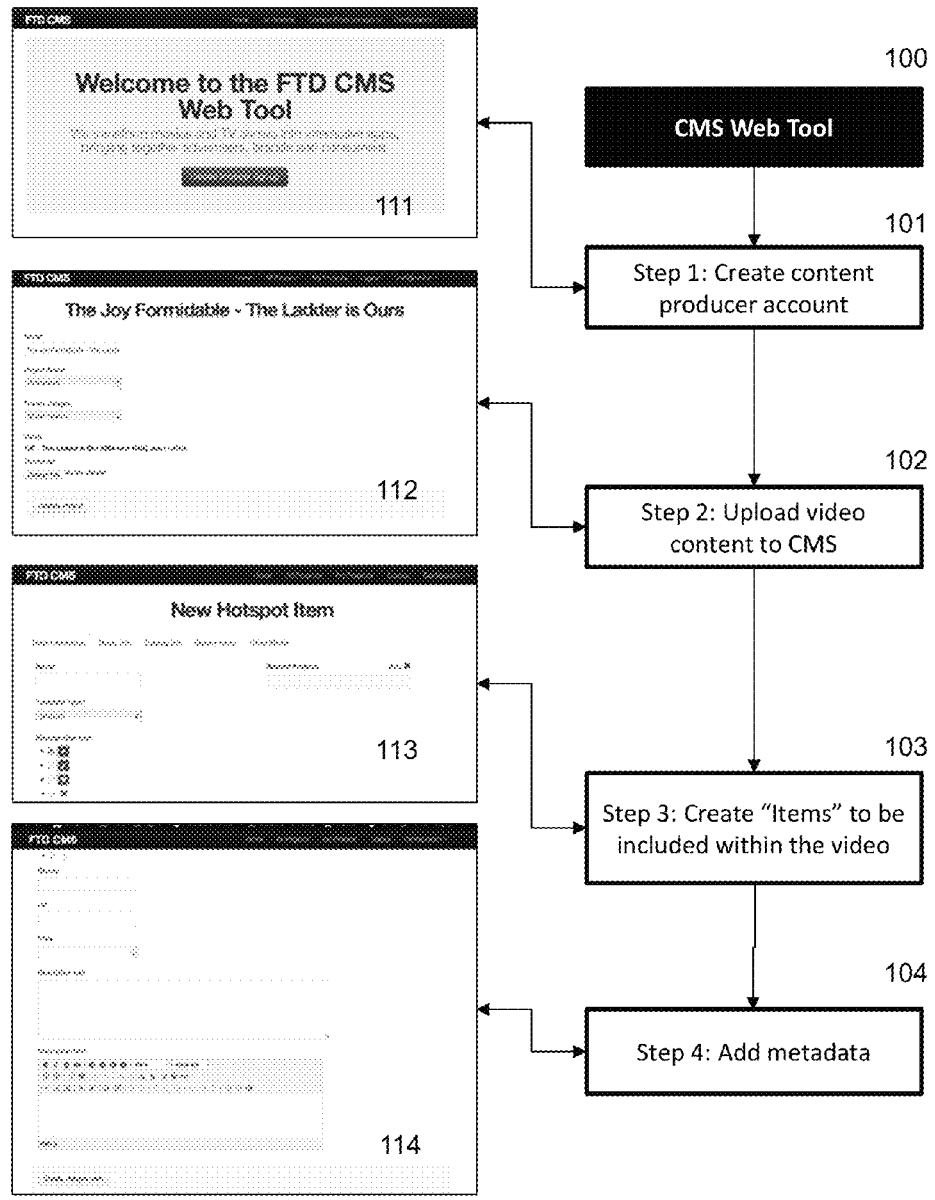
FIG. 5 shows the flowchart of an exemplary items generation process in the content management system (CMS component or CMS Web Tool).

With reference to the CMS component of the authoring software, the CMS component can be used for creation of one or more items to be reproduced in a designated video stream (see e.g., FIG. 5). The term "items" describe specific and unique objects or areas generated by the CMS component of the authoring software that can be linked to the objects in the video stream using hotspots generated by the composer tool (tag authoring process). The items, therefore, can be used to represent objects, regions and themes in the video frames. In an exemplary embodiment, the user can create a project, preferably over the web, that includes one or more video files and one or more items with metadata. Each item can include, but is not limited to, (a) metadata information, (b) media information, (c) catalog information, (d) images, (e) secondary videos, and (f) other relevant information, preferably stored on an SQL-type database for future use and manipulation by the user. At any time during the process, the user can view a list of items and select which item is related to which object or area using a unique ID key, by incorporating a metadata item list file generated by the CMS component. Within the CMS component environment the user can, among others, create additional users and authoring system administrators categorized by specific permissions and taxonomy related to user's needs, and/or create permissions and taxonomy categories related to user's needs. Taxonomy is defined herein as a particular classification ("the taxonomy of . . ."), arranged in a hierarchical structure. In one embodiment, the CMS authoring also allows the user to create a project, which contains other categories and taxonomies allowing the user to create representations and data models or objects or areas generated by the composer tool component (or tag authoring process).

In another embodiment, the CMS component of the authoring software allows the user to create structures in XML, JSON or other languages, which can be edited to allow for changes in the model data structure of the items, add metadata such as links to images, video and text as well as other abstract information necessary to describe the item, and add, store and edit images, video, and text in an editable format which is specific to the software that will interpret and display it.

In yet another embodiment, the CMS component of the authoring software allows the user to generate and store files representing the item metadata using unique IDs, which can be used to relate the metadata to tagging data generated by the composer tool (tag authoring process). The CMS component also allows the user to view a list of tagged objects and areas generated by the tag authoring process. Specifically, The CMS component allows the user (1) to select which item is to be related to a particular object or area using a unique ID key, (2) view an editable list of videos which are already authored and tagged or need to be tagged, (3) view the associated tagged object list generated by the tag authoring process (composer tool), and (4) view a visual or audio or other representation of the tagged objects and areas, if any, while viewing the videos in the list. In a preferred embodiment, the CMS authoring component also allows the user to do a search of items based on keywords, text or other metadata, and/or frame location—temporal or spatial in the case of video.

Again with regard to the authoring software, in some embodiments, the user can automatically generate items from outside of the CMS by using metadata to call outside services to pull relevant images, video, advertising, search results etc. from outside of the CMS, do a search of CMS authored items based on keywords, text or other metadata, and/or frame location—temporal or spatial in the case of video; do a search of tagged objects or areas in the video by time or frame location in the tag authored file generated by the composer tool (tag authoring). All objects and metadata are accessible at any point during the viewing process. Searching can pull up metadata at any point in the viewing process. Searching can be done via keywords or tags that are part of the metadata. Searching can be done via different types of human interaction, such as by using a remote control, a keyboard, a gesture recognition system, a touch screen, audio and voice recognition system and more.

With reference to the composer tool of the authoring software, once the project with items is created, the composer tool can be used, either a standalone application or as part of the authoring software, to attach items generated by the CMS component to the objects (hotspots) inside a particular video stream/file. In one exemplary embodiment, a project can be selected with one or more available items. After processing, the video associated with the project contains a plurality of key frames that can be displayed and reviewed at a frame rate of 0.1, 0.5, 1, 2, 5, 10, 24, 60 frames/second or any frame rate therebetween. Alternatively, the key frames can be displayed based on the "scene" within the video. Once a frame is identified with an object of interest, a hotspot (XY or XYZ coordinates) is selected and associated with an item in the project. Additional parameters can also be added that correlate the item to the hotspot and the object of interest. The coordinate system of the hotspots is based on spatial and temporal parameters. For example, in a 2D video, XY coordinates define the location of the object in the frame and t (time) coordinate defines the time stamp of when the object first appears in the video. Thereafter, the video is advanced to the next frame in time. Since the object may move, the hotspot will be displaced. In order to track the object the XY coordinates of the hotspot are adjusted to a new t timestamp. Thus, for the duration the object appears on the screen, the hotspot tracks the object as a function of steps. Since the steps are associates with only the key frames, the location of the hotspot in the remaining frames can be automatically interpolated by the composer tool based on curve fitting (linear, polynomial, spline, Gaussian) or regression analysis. The information obtained from the composer tool regarding the associated hotspots and items is preferably submitted back to the CMS component for future manipulation and/or playback.

With reference to the playback tool of the authoring/playback software, the player tool is preferably a standalone application that allows users to view the videos and interact with the overlaid information prepared with the CMS and the composer tool during the playback. In a typical operation of the player tool, the user is provided with a library of the overlaid files that can be played in the player tool, at which points the user can select a video to play. In one embodiment, a short introduction about the video can be displayed before the playback is initiated. The playback can start automatically after a predefined pause (e.g., 2-10 seconds) or the user can initiate the playback manually by pressing "PLAY". Depending on the setting of the player tool, the graphical video overlay, which visually shows the viewer/user the interactive areas of the video, can be revealed automatically or by an action of the user (e.g., touching the touch-sensitive screen). At any time during the playback, the user can select a displayed icon with an object of interest.

At the service provider side with reference to FIG. 1, the service provider 2 can have a merchant gateway, third party content/product feeder and the web-subscription services. In one exemplary embodiment, a service provider 2 delivers the streaming media and metadata about the objects represented in the streaming media through the Internet 4. This data is transferred through an Internet access means 6 in a wired or wireless manner to the media reproduction device 10. The user interacts with the media reproduction device 10 through the user interface 16. The service provider 2 may also provide user services such as e-commerce gateways, social sharing, location and other services, related to the video embedded entities tagged within the encoded video content. In an exemplary embodiment, the interface script can be stored in the firmware of the media reproduction device 10 (e.g. a random-access memory or RAM 14). Alternatively, the interface script can be stored in a video media 12 (e.g. a DVD disk) or downloaded from the service provider 2 through Internet 4 and subsequently loaded into the RAM 14 of the media reproduction device 10 before the program is executed.

Figure 2:
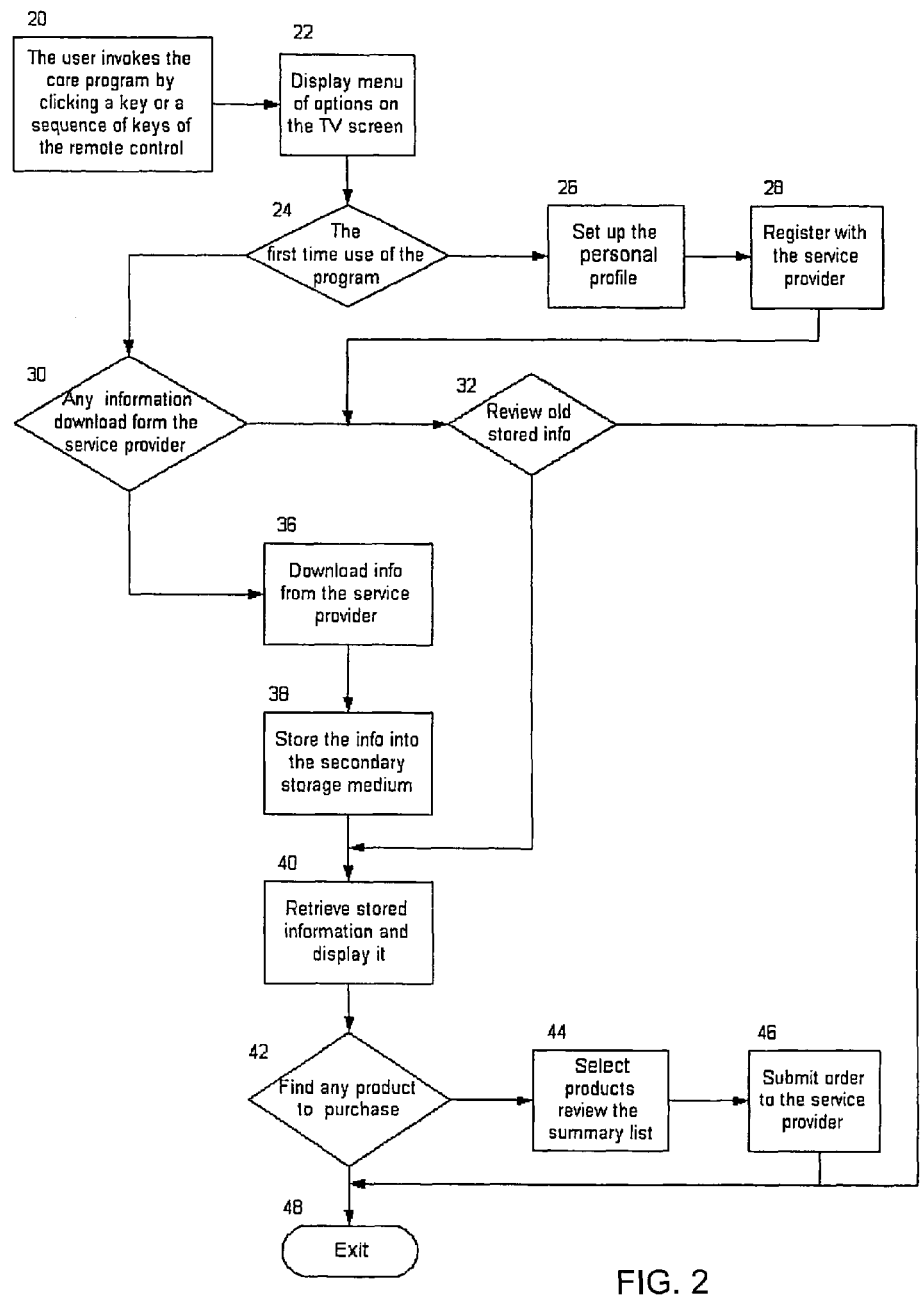
FIG. 2 is a flowchart of an exemplary ordering process.

In an exemplary embodiment presented in FIG. 2, regardless of how the program is loaded, a user can initiate the program by clicking a predetermined key or a pre-determined sequence on the user interface 16 (Step 20). In response, a menu of options appears on the display device 8 (Step 22). If this is the first time that the user has invoked the program (Step 24), the user can select an option from the menu to set his/her personal profile, which may include a user ID, password, credit card number and/or other personal information (Step 26). The supplied information can be stored locally, on service provider's server, or remotely with a third party service (e.g. Google Wallet), and is preferably saved in encrypted form. Once the user finishes editing the personal profile, the user has the option to upload the profile to the service provider 2 for registration purposes if the profile is stored locally (Step 28). Upon registration, the service provider 2, through Internet connection 4, can start to download data into the User's media reproduction device 10 (Steps 30 and 36). The downloaded information can be product catalogs, commercial advertisements, marketing promotions or the entertainment package(s) the user purchased, such as movie, audio data, music, or even a software program. The downloaded data can be temporally stored in the RAM 14 of the User's media reproduction device 10 and subsequently stored in a secondary media (e.g. hard disk, DVD media, flash memory etc.) in Step 38. Alternatively, the downloaded data can be permanently stored in the RAM 14 of the User's media reproduction device 10.

Preferably, the authoring/playback software can use a the predefined format of metadata and the interface (product display layer) to define and link specific video content to object-specific marketing. The product display layer is a specific interface format of interface layered on top of and time-synched with the video content, which is also spatially and temporally synched with hotspots in the video content. Synched video content may include additional video content synched to the original video timeline. Synched video content may include alternative versions of the original video content. Synched video content may consist of 3D video-game engine content synched to the original video timeline and 2D/3D coordinates of objects in original video. The overlay-layer can display video embedded entity markers as well as other contextual details and information. The markers can be defined as a collection of data points that describes and facilitates the display of graphic markers on a display device in the context of 2D or 3D location within the dimensions of the visualized on the screen video content. Using a simple time dependent x/y or x/y/z coordinate system relative to the video content frame of reference, the marker can appear and disappear on the visualized video content. The time stamp defines when the marker appears and the duration of the marker's appearance on the visualized video content relative to the video time frame and encoding.

A third party can use the disclosed format structure to define his/her products and go through the service provider to offer its products to the end user. There are at least two file types which can be used by the authoring/playback software to create the product display layer. First, the metadata file contains a list of different markers that define an item. For example, one of the markers may be a timecode, which is in synch with the timecode of the media reproduction device. Other markers may include information about specific products featured in the media content, a product-id, and the information about a hotspot area of the video embedded entities. The metadata file may also include two-dimensional (2D) or three-dimensional (3D) coordinates to indicate where the hotspot associated with the item will be displayed on the display device. In a preferred embodiment, the metadata file would also contain a reference to the latest version of its related Featured Product Information Data file ("FPID"). The FPID contains product specific data tied to the Metadata file's hotspot by product id as a key. This FPID data can include Brand Name, Price, Options and other information. Both the metadata and FPID files can be accessed either through an online download or from locally stored video media (e.g. DVD disk, digital file, etc.) that may contain the metadata and/or FPID file on extra tracks. The presence of such data on the media, as defined herein, makes such media content system compatible. To be a compatible format, the media must contain the FPID file in synch with the content stored on separate tracks of the media. The authoring/playback software creates the product display layer using data selected from text, graphics, display style information, such as font, colors, size, position etc., from the metadata file and its associated FPID file. The product display layer contains the hotspots created using the data from the two files. This allows a user to point to or highlight the product(s) to obtain additional information, to make a purchase selection and/or to perform other actions with the product.

All the downloadable data, the user personal profile, the authoring/playback software, merchant account information, user profile files, FPID, and user activity history file can be storable in digital form on a secondary storage either locally or remotely in cloud storage, preferably in an encrypted and secure format. The authoring/playback software can provide an index to organize these data during storing or retrieving. For example, the FPID includes product information, such as brand name, price, availability, seller (if many) manufacturing information, reviews and options. This information can be held in a variety of formats, such as a delimited text file, an xml file, or an image file. All information can be stored locally, online, or on extra tracks of the media specifically supporting the authoring/playback system. Moreover, if the downloaded data is in a compatible format, the downloaded data will include an overlapping layer of metadata. The downloaded data may also include other programs, such as interface routines that describe and manipulate information about specific content existing in the media.

Upon receiving the downloaded data, the system retrieves a timecode from the media reproduction device which has a built-in real-time clock. The metadata layer, on the other hand, contains timecode markers, which are in synch with the video content timecode. The metadata layer can also contain related display data (text, graphics, style information [font, colors, etc.]), including two-dimensional or three-dimensional coordinates for the product(s) to indicate where it will be displayed on the display device. The authoring/playback software also allows a user through using a remote control to point to or highlight the displayed product(s) to make a selection. The downloadable data can be in preexisting media content formats or in new authoring/playback software compatible format. In one particular embodiment, if the downloaded data is in a DVD-Video format, the overlay data can be written into the media content with necessary index and information, which can be retrieved later when the video data is retrieved from the media.

Returning to FIG. 2, if the user has already registered his account with the service provider, the user turns on both display device and the media reproduction device, and connects the media reproduction device to the Internet. The user can operate the media reproduction device in a traditional manner or instead can click a designated key of the media reproduction device interface. For example, the user may click on the "info" key, to pause the media reproduction device playback operation, and then another designated key to invoke the authoring/playback software (also refered to as DEIISS program/system) (Step 20). The program checks if any metadata exists that corresponds to the media being played (Step 30). In that regard, the program automatically connects to the service provider through Internet to download an updated metadata file (Step 30). If there is no updated metadata to download, the system hands the control to the regular media reproduction device interface software to run the regular video media functions (Step 32). Alternatively, if a new or an updated metadata file exists from the service provider, it is downloaded into the media reproduction device (Step 36). Meantime, the program can also check if there is new FPID. The user can decide if he/she wants to view the FPID or not. Using the user interface of the media reproduction device, the user can carry out all functions of the DEIISS system. For example, by clicking a designated key of the media reproduction device interface, a menu of selections is displayed on the display device (Step 22), where several choices, such as manage user profile; manage credit card information; view purchase history; view playback history; download software update; and view $3^{rd}$ party products. The user can click a key or sequence of keys to select one of these options and follow the self-explanatory description displayed on the display device to proceed. Therefore, a user using the media reproduction device user interface can retrieve the metadata layer at any time during the video playback, and views all available items (video embedded entities) with their description in detail. The user can also pause the video playback, then tab through the visible tags that describe a particular item and highlight the desired item.

The System retrieves the relevant FPID file and the metadata file from the storage and compares the media reproduction device's timecode with the time code of the metadata. The system can also retrieve the hotspot (window display area/video embedded entity marker) information, which contains the display information regarding to the item (video embedded entities) on the display device, such as the top-left correlating position and the width and high of the display window. By selectively pushing the key of the media reproduction device user interface, the user goes through menu displayed and selects the items he/she wants to display, manipulate, purchase or other activity. At the end, a summary of the user's selections will be displayed. The user can either confirm the selections or go back to change the selections before submitting, for example, the purchase order, if this is the functionality the user is performing on the items. The order includes the product(s) (items or video embedded entities) he/she wants to purchase, personal account information including shipping and billing addresses. The transaction between the user and the service provider and all these stored information are preferably stored and/or transmitted in the art recognized encryption and security protocols. The transaction is preferably done using encrypted secured sockets connection between the display device and the merchant gateway. Hence, by clicking one or more keys or similar interaction with the particular media reproduction device user interface, the user places an order through the Internet to the service provider.

Figure 4:
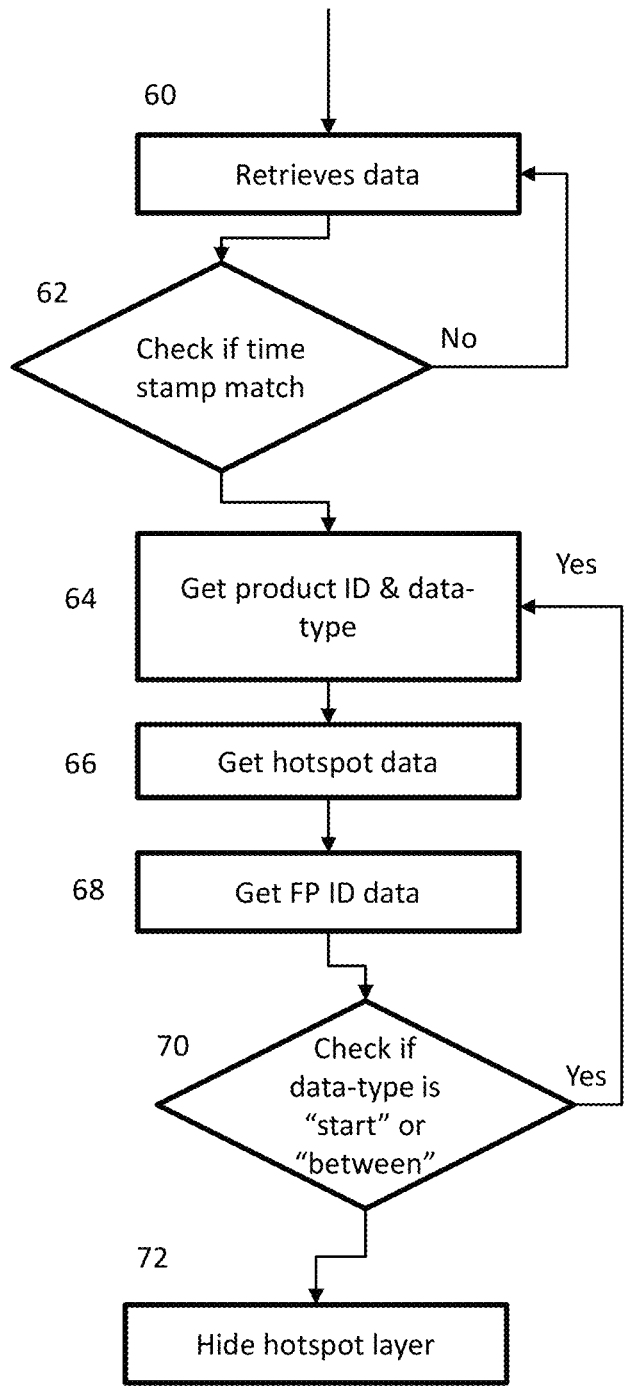
FIG. 4 shows the flowchart of an exemplary data retrieve process after the user selects a product from the displayed list.

FIG. 4 illustrates the flow logic and operational semantics of authoring/playback software when a user picks a video embedded entity (item) from the displayed selections. The authoring/playback software, based on the selection, searches the metadata layer and FPID files and retrieves the video embedded entity's timestamp (Steps 60 and 62). If the timestamp matches, then the software gets the product ID and data-type (Step 64). The software also gets the corresponding video embedded entity marker data (Step 66) and corresponding FPID data (Step 68). The software further checks if the data-type is a "start" type or a "between" type (Step 70), which means that there are more data associating with the current product-id and needed to be further retrieved. If it is, then the software goes back to Step 62 and retrieves more associating information until the new retrieved data-type is an "end" type. When the data-type is an "end" then the software hides the video embedded entity marker layer (Step 72).

Although, an exemplary embodiment discussed above is made in reference to a media content stored locally on a DVD/Blue-ray type devices, the scope of the invention is not particularly limited to only locally distributed media. In one exemplary embodiment, the user can purchase entertainment products, such as movie, music etc., in downloadable digital format from the service provider. Once the entertainment product is downloaded, it can be locally stored either on the secondary storage (e.g internal hard disc) or on a writable DVD/Blue-ray. Alternatively, the entertainment product can be streamed from the service provider or a third-party service provider.

Furthermore, as an alternative the media reproduction device can have different built-in secondary store media, such as a hard drive, DVD media, extra RAM memory, to store the authoring software, movie metadata files, composer software, playback software, merchant account information, user profile files, FPID, and user activity history file. As another alternative, some of these programs and files can be downloadable from Internet. It will be readily understood by those skilled in the art that the authoring/playback software can be implemented in different programming language as long as it can perform the required functions.

Although, the functionality can work through the use of a DVD or Blu-Ray player remote control in one exemplary embodiment, it is also within the scope of the present invention that the authoring/playback software would allow viewers of video content to simply tap or touch an object and pull up linked metadata on a touchscreen device, perform gestures that can be used through the interface while displaying content on a platform that supports gesture recognition such as Xbox Kinect, or through the use of audio or voice command.

Finally analytic information related to user behavior during playback can be stored and displayed on an analytics dashboard. Information stored can include length of viewing, tagged objects that have been accessed along with the XY coordinate and timecode, actions taken after metadata access such as purchases, social, etc.

EXAMPLES

Example 1

Figure 6:
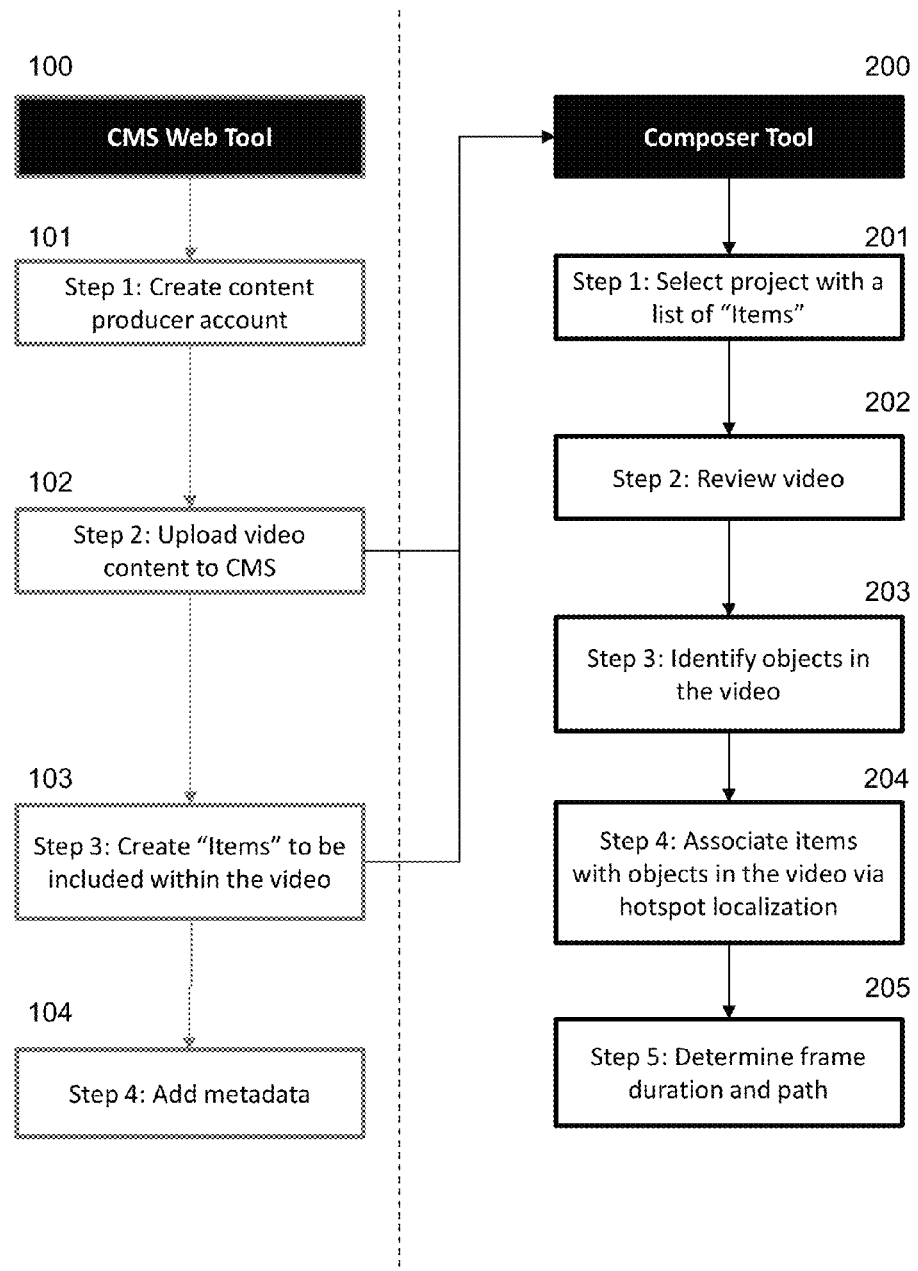
FIG. 6 shows the flowchart of exemplary steps taken in the composer tool, i.e., the process of linking items to objects in the video stream via hotspots and its relationship to the CMS Web Tool.

An exemplary embodiment of the system will be described in detail with reference to FIGS. 5-7. The authoring and playback ssystem was written in Objective-C, Apple's Mac code language, and built on Apple's iOS framework for touch interfaces of Apple Devices (e.g. iPhone, iPad, etc.). However, it can be readily ported to Flash, C++, C# or other languages, depending on the interfaces and hardware selected for support (e.g., Google Android).

The authoring and playback system consists of three components: (1) content management system/software; (2) composer tool, and (3) playback tool. Each component is independently implemented, although, the components can be part of one interactive system having the capabilities of all three components.

Example 2

This example illustrates the design and implementation of the first component of the authoring and playback system— the interactive content management system (CMS) 100 for creation of one or more items (video embedded entities) to be reproduced in a designated video stream (see FIG. 5). In step 101, the user creates an account, preferably over the web as illustrated in the screen capture 111. After the creation of the account, the user can create a project as shown in the screen capture 112. In the illustrated embodiment, the user has an option to name the project, provide its status (e.g., pending or processed) and category. Once the project is created, a video file of any format can be readily uploaded in Step 102. For Apple's iOS framework, the preferred video format is H264/MPEG-4 Part 10 (Advanced Video Coding). Once the video is uploaded in Step 102, one or more items can be created in Steps 103 and 104. Each items includes, but not limited to, (a) metadata information, (b) media information, (c) catalog information, (d) images, (e) secondary videos, and (f) other relevant information. For example, as shown in the screen captures 113 and 114, the metadata information may include name of the item, type/purpose of the item (e.g., product, service, etc.), related projects, images, description either in plain or formatted text (e.g., html encoded), JavaScript, merchandise icon, source, URL (uniform resource located; also known as web address), and geotag. The information is stored on an SQL-type database for future use and manipulation by the user.

Example 3

This example illustrates the design and implementation of the second component of the authoring and playback system—a composer tool 200. FIG. 6 illustrates the relationship between the composer tool 200 and the interactive CMS 100. The composer tool 200 is preferably a standalone application that allows users to attach items generated by the CMS 100 to objects inside a particular video stream/file via a process called tagging. In one exemplary embodiment, all processed objects are available for editing in the composer tool 200. In step 201, a project is selected with one or more available items. After processing, the video associated with the project contains a plurality of key frames that can be displayed and reviewed in step 202 at a frame rate of 0.1, 0.5, 1, 2, 5, 10, 24, 60 frames/second or any frame rate therebetween. Alternatively, the key frames can be displayed based on the "scene" within the video. Once a frame is identified with an object of interest in step 203, a hotspot is selected and additional parameters are added that correlate the item to the object of interest. The additional parameters may include XY coordinate that define the location of the object in the frame and t coordinate defines the time stamp of when the object first appears in the video. In the final step 205, the video is advanced to the next frame in time. Since the object may move, in order to track the object the XY coordinates of the hotspot are adjusted to a new t timestamp. Similar approach is taken with a 3D video content with additional coordinate system in Z. Thus, for the duration the object appears on the screen, the hotspot tracks the object as a function of steps. Since the steps are associates with only the key frames, the location of the hotspot in the remaining frames can be automatically interpolated by the composer tool 200. That is, the new hotspots within the range of a discrete set of known hotspots (steps) are reconstructed based on curve fitting (linear, polynomial, spline, Gaussian) or regression analysis.

Example 4

Figure 7A:
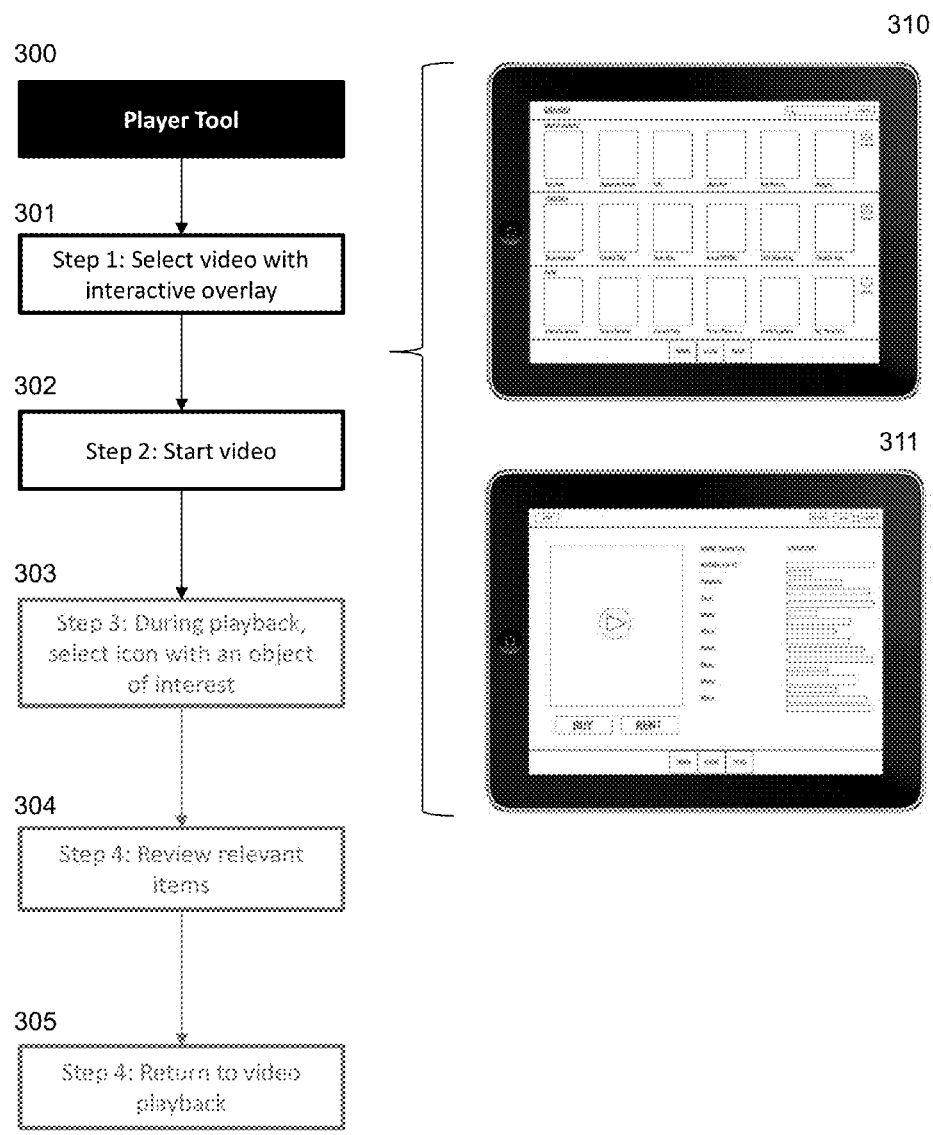
FIGS. 7A-7B shows the flowchart of exemplary steps taken in the player tool, i.e., the process of selecting information from the interactive overlay.
Figure 7B:
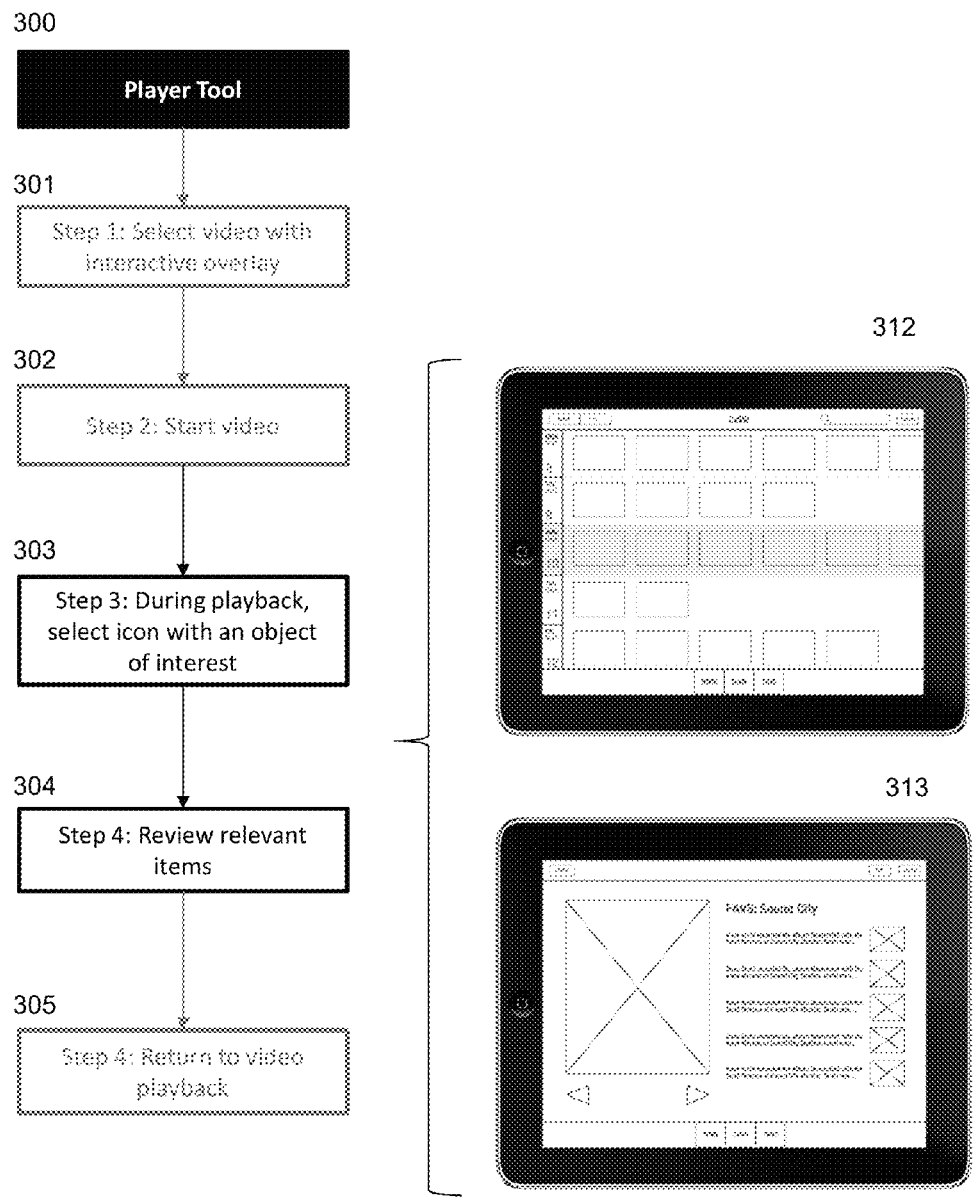

This example illustrates the design and implementation of the third component of the authoring and playback system—a playback (player) tool 300 as shown in FIGS. 7A-7B. The player tool 300 is preferably a standalone application that allows users to view the videos and interact with the overlaid information prepared with the CMS 100 and the composer 200 during the playback. In a typical operation of the player tool 300, the user is provided with a library 310 of the overlaid files that can be played in the player tool 300. In step 301, a video is selected. In one embodiment, a short introduction about the video can be displayed before the playback is initiated (see Screen Capture 311). In step 302, the playback can start automatically after a predefined pause (e.g., 2-10 seconds) or the user can initiate the playback manually by pressing "PLAY" (see Screen Captures 311). Depending on the setting of the player 300, the graphical vide overlay, which visually shows the viewer/user the interactive areas of the vide, can be revealed automatically or by an action of the user (e.g., touching the touch-sensitive screen). At any time during the playback, the user can select a tag (displayed icon) associated with an object of interest in step 303. By selecting the icon (tag), an item is called and, in one exemplary embodiment, a compact gallery can be triggered for an actor. By clicking on the compact gallery, additional information can be displayed (312 & 313). For example, the information can be linked via URL to an outside source that can be displayed by the player using its internal web browser. In yet another embodiment, the displayed information can be shared using one of available social media (e.g., Facebook, Twitter, etc.).

Example 5

This example illustrates the design and implementation of the authoring and playback system in a screenplay product placement. Specifically, the system allows screenwriters to tag objects, regions and themes in the screenplay, then submit the screenplay to a web-based platform, which allows advertisers/interested parties to bid on product placement related to tagged objects, regions and themes in the screenplay. Screenwriters are allowed to highlight words or paragraphs describing objects, regions and themes in their screenplay. These highlighted words can then be related to Items created in the CMS system, which then describe them.

Advertisers are allowed to view/search lists of items and their screenplay context, categorized by keywords. They can then select an item on which they can bid for product placement. Other advertisers are allowed to bid on the same item. Once items are purchased, Advertisers use the CMS system to add metadata such as text, images, video and other media to the Item purchased.

During video content production, the composer tool for tag authoring is used to tag the item in the video frames and to allow viewers to display the metadata related to that object, region or theme in the video frame which is produced with and for the advertiser who owns the product placement item.

For example, in the screenplay by Annie Mumolo and Kristen Wiig entitled "Bridesmaids" (Copyright, Universal Pictures), the advertisers can tag the dress (item) during the discussion between characters;

Lillian walks out in a very ornate COUTURE wedding dress
      [[TAG]]. She looks crazy gorgeous. The girls GASP.
        RITA (fanning herself)
      [Wow], you look amazing.
        MEGAN
      That dress is so beautiful it makes my stomach hurt.
        ANNIE
      Lill, I don't know what to say.
        You are—

In the above example, after the submission of the screenplay to a web-based platform, for instance sponsored by Universal Pictures, advertisers (e.g. Alita Graham, Alfred Angelo, Vera Wang, etc.) can bid on product placement related to tagged wedding dress in the screenplay. Once items are purchased, advertisers use the CMS system to add metadata such as text, images, video and other media to the item purchased.

Example 6

This example illustrates as shown in FIG. 3 the structure of a sample metadata file written in XML language. The metadata file entitled metadata_spiderman2.xml. The file is designed for use with a movie Spiderman 2 released in 2004 on DVD format. Initially, the metadata file identifies the target video content with a unique id number. The metadata file contains the advertisers name, contact information, and the product to be sold. In this particular example it is Mattel® Toys Spidey T-Shirt. The metadata file ends with the seller location.

The description provided herewith has not attempted to exhaustively enumerate all possible variations. That alternate embodiments may not have been presented for a specific portion of the invention, and may result from a different combination of described portions, or that other undescribed alternate embodiments may be available for a portion, is not to be considered a disclaimer of those alternate embodiments. It will be appreciated that many of those undescribed embodiments are within the literal scope of the following claims, and others are equivalent. Furthermore, all references, publications, U.S. Patents, and U.S. Patent Application Publications cited throughout this specification are hereby incorporated by reference in their entireties as if fully set forth in this specification.

The invention claimed is:

1. An interactive video content management and display method comprising:
    loading an interactive video content management system program into a RAM of a video display device;
    executing the loaded program;
    creating a layer of one or more items having a metadata to define and link a product specific data;
    overlaying the layer of items with a video featuring the product, wherein the position of the item is determined by a hotspot defined by spatial and temporal coordinates of the product, where the spatial coordinates of the product describe XY or XYZ coordinates within a video frame and the temporal coordinate describes the appearance of the product in relation to an overall length the video;
    displaying the video on the video display device with the corresponding interactive overlay layer;
    selecting the hotspot item of the featured product during a playback of the video whenever the featured product appears in the video; and
    displaying the product specific data on the video display device,
    wherein the program creates the hotspot and displays the product specific data whenever the featured product appears in the video content utilizing a product display layer which comprises a first file type comprising the metadata that associates a data-type to a timestamp that is synchronized with a timecode of a timing device, a hot spot area marker identified by the XY or XYZ and temporal coordinates, and a unique product-id marker, wherein said timestamp, hot spot area marker, and product-id marker are associated with the featured product.

2. The interactive video content management and display method of claim 1, wherein the video display device is selected from a tablet computer, a smartphone, a computer with connected thereto monitor, a web-ready TV, a DVD player with connected thereto TV, a Blu-Ray player with connected thereto TV, or a web-ready network player with connected thereto TV.

3. The interactive video content management and display method of claim 1, further comprising: displaying a menu of options for a user to select on the video display device.

4. The interactive video content management and display method of claim 3, wherein the menu of options provides the user with ability, through the selection of options of the menu, to highlight a featured product in the video with a hotspot and display associated product specific data.

5. The interactive video content management and display method of claim 1, wherein the metadata comprises product identification information, spatial and temporal coordinates, text, images, videos, dynamic objects, and URL links.

6. The interactive video content management and display method of claim 3, wherein the menu of options provides the user with ability, through the selection of options of the menu, to set up a user's personal profile, account information and register with a service provider, and at the service provider side, receiving and maintaining the information of a registered user.

7. The interactive video content management and display method of claim 6, wherein the menu of options provides the user with ability to select the featured product and display the product specific data for purchasing and placing an order through Internet with the service provider, and at the service provider side, providing information including available products and their relevant information, and processing the order placed by the user.

8. The interactive video content management and display method of claim 7, wherein loading the interactive video content management system program into RAM of a video display device further comprising loading the program from ROM, RAM, a local data storage, an optical disk, or networked data storage.

9. The interactive video content management and display method of claim 1, wherein the video is a movie, a music video, a short film, a movie trailer, an advertisement, a promotional video, or a non-commercial video.

10. The interactive video content management and display method of claim 3, wherein displayable menus and lists of products with their detail information further comprising product brand name, price, availability, seller, manufacturer, options and reviews.

11. An apparatus comprising:
at least one processor; and at least one memory including a computer program code;
the at least one memory and the computer program code configured, with at least one processor, to load and execute the computer program code in the memory that,
creates a layer of one or more items having a metadata to define and link a product specific data;
overlays the layer of hotspots with a video featuring the product, wherein the position of the item is determined by the position of the hotspot defined by spatial and temporal coordinates, where the spatial coordinates describe XY or XYZ coordinates within a video frame and the temporal coordinate describes the appearance of the product in relation to an overall length the video;
displays the video with the corresponding interactive overlay layer;
allows a selection of the product during a playback of the video whenever the hotspot of the product appears in the video; and
displays a product specific data;
wherein the computer program code creates the hotspot and displays the product specific data whenever the featured product appears in the video content utilizing a product display layer which comprises a first file type comprising the metadata that associates a data-type to a timestamp that is synchronized with a timecode of a timing device, a hot spot area marker identified by the XY or XYZ and temporal coordinates, and a unique product-id marker, wherein said timestamp, hot spot area marker, and product-id marker are associated with the featured product.

12. The apparatus of claim 11, wherein the apparatus is selected from a tablet computer, a smartphone, a computer with connected thereto monitor, a web-ready TV, a DVD player with connected thereto TV, a Blu-Ray player with connected thereto TV, or a web-ready network player with connected thereto TV.

13. The apparatus of claim 11, wherein the at least one memory and the computer program code is further configured to display a menu of options for a user to select.

14. The apparatus of claim 13, wherein the menu of options provides the user with ability, through the selection of options of the menu, to highlight a featured product in the video with a hotspot and display associated product specific data.

15. The apparatus of claim 11, wherein the metadata comprises product identification information, spatial and temporal coordinates, text, images, videos, dynamic objects, and URL links.

16. The apparatus of claim 11, wherein the apparatus further comprises ROM, RAM, a local data storage, an optical disk, or networked data storage.

17. The apparatus of claim 11, wherein the video is a movie, a music video, a short film, a movie trailer, an advertisement, a promotional video, or a non-commercial video.

18. A computer program product comprising:
a non-transitory computer readable medium having
computer executable program code stored therein, which when executed by a processor causes an apparatus to perform identifying and marking the location of a featured product and the featured product's specific data in a video media,
wherein the computer program code creates a hotspot and displays the product specific data whenever the featured product appears in the video content utilizing a product display layer which comprises a first file type comprising metadata that associates a data-type to a timestamp that is synchronized with a timecode of a timing device, a hot spot area marker identified by the XY or XYZ and temporal coordinates, and a unique product-id marker, wherein said timestamp, hot spot area marker, and product-id marker are associated with the featured product.

19. A computer program product comprising:
a non-transitory computer readable medium having
computer executable program code stored therein, which when executed by a processor causes an apparatus to perform a video media with a corresponding interactive overlay layer having one or more hotspots defined by spatial of a video frame and temporal coordinates described by the appearance of a product in the video in relation to an overall length the video;
a selection of the product during a playback of the video whenever the hotspot of the product appears in the video; and
a product specific data;
wherein the computer program creates the hotspot and displays the product specific data whenever the featured product appears in the media content utilizing the overlay layer which comprises a first file type comprising metadata that associates a data-type to a timestamp that is synchronized with a timecode of a timing device, a hot spot area marker identified by the XY or XYZ and temporal coordinates, and a unique product-id marker, wherein said timestamp, hot spot area marker, and product-id marker are associated with the featured product.

20. The apparatus of claim 11, wherein the apparatus is selected from a tablet computer, a smartphone, a computer with connected thereto monitor, a web-ready TV, a DVD player with connected thereto TV, a Blu-Ray player with connected thereto TV, or a web-ready network player with connected thereto TV.

21. An interactive video content management and display method for identifying and marking the location of specific products within digital media said method comprising:
loading an interactive video content management system program into a RAM of a video display device;
executing the loaded program;
creating a layer of one or more items having a metadata that link a product specific data;
overlaying the layer of items with a video featuring the product, wherein the position of the product is determined by a hotspot, wherein the program creates the hotspot and displays the product specific data whenever the featured product appears in the video content utilizing a product display layer which comprises a first file type comprising the metadata that associates a data-type to a timestamp that is synchronized with a timecode of a timing device, a hot spot area marker identified by XY or XYZ and temporal coordinates, and a unique product-id marker, wherein said timestamp, hot spot area marker, and product-id marker are associated with the featured product;
displaying the video on the video display device with the corresponding interactive overlay layer;
selecting the hotspot item of the featured product during a playback of the video whenever the featured product appears in the video; and
displaying the product specific data on the video display device.

* * * * *